United States Patent
Jo et al.

(10) Patent No.: US 10,573,270 B2
(45) Date of Patent: Feb. 25, 2020

(54) ELECTRONIC DEVICE AND METHOD FOR PREVENTING CURRENT CONSUMPTION BY ELECTRONIC DEVICE

(71) Applicant: Samsung Electronics Co., Ltd, Suwon-si, Gyeonggi-do (KR)

(72) Inventors: Jeong-Gyu Jo, Hwaseong-si (KR); Seung-Goo Kang, Seongnam-si (KR); Jin-Hwan Seo, Suwon-si (KR); Hyun-Ho Shin, Suwon-si (KR); Bo-Kyung Sim, Suwon-si (KR); Dong-Il Son, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/884,216

(22) Filed: Jan. 30, 2018

(65) Prior Publication Data
US 2018/0226048 A1     Aug. 9, 2018

(30) Foreign Application Priority Data

Feb. 3, 2017   (KR) ....................... 10-2017-0015394

(51) Int. Cl.
*G09G 5/00*     (2006.01)
*G06K 9/00*     (2006.01)
*G09G 5/10*     (2006.01)

(52) U.S. Cl.
CPC ......... *G09G 5/003* (2013.01); *G06K 9/00604* (2013.01); *G09G 5/10* (2013.01);
(Continued)

(58) Field of Classification Search
CPC ............ G09G 5/003; G09G 5/10; G09G 3/20; G09G 2330/021; G09G 2340/0435;
(Continued)

(56) References Cited

U.S. PATENT DOCUMENTS

| 8,243,133 B1 | 8/2012 | Northcott et al. |
| 2003/0197790 A1 | 10/2003 | Bae |

(Continued)

FOREIGN PATENT DOCUMENTS

| EP | 1505567 A1 | 2/2005 |
| GB | 2403096 A | 12/2004 |

(Continued)

OTHER PUBLICATIONS

European Search Report dated Aug. 24, 2018 in connection with European Patent Application No. 18 15 4894, 22 pages.

(Continued)

*Primary Examiner* — Premal R Patel

(57) ABSTRACT

According to various exemplary embodiments, an electronic device may include: a camera unit; a processor; and a data processing unit that is electrically connected to the camera unit and the processor, wherein the data processing unit may detect a first number of pixels corresponding to first illuminance data based on first pixel data received from the camera unit to transmit the first number of pixels to the camera unit, and may determine a brightness of a display corresponding to second illuminance data based on second pixel data received from the camera unit in which a sensor corresponding to the first number of pixels is turned on.

20 Claims, 12 Drawing Sheets

(52) U.S. Cl.
CPC .............. *G09G 2320/029* (2013.01); *G09G 2320/0626* (2013.01); *G09G 2330/023* (2013.01); *G09G 2360/145* (2013.01)

(58) Field of Classification Search
CPC ....... G09G 2330/023; G09G 2320/029; G09G 2360/145; G09G 2360/144; G09G 2320/0626; G06K 9/2027; G06K 9/00973; G06K 9/00604
See application file for complete search history.

(56) References Cited

U.S. PATENT DOCUMENTS

| | | | |
|---|---|---|---|
| 2008/0165203 A1* | 7/2008 | Pantfoerder | G09G 3/20 345/589 |
| 2009/0122039 A1* | 5/2009 | Katoh | G02F 1/136227 345/207 |
| 2011/0007103 A1 | 1/2011 | Han et al. | |
| 2012/0092541 A1 | 4/2012 | Tuulos et al. | |
| 2014/0055635 A1 | 2/2014 | Seo | |
| 2015/0116344 A1 | 4/2015 | Won | |
| 2015/0264278 A1* | 9/2015 | Kleekajai | H04N 5/2351 348/227.1 |
| 2015/0269419 A1* | 9/2015 | Bae | G06K 9/00604 382/117 |
| 2016/0125221 A1 | 5/2016 | Kim et al. | |
| 2016/0365021 A1* | 12/2016 | Hancock | G06F 3/04897 |
| 2017/0017842 A1* | 1/2017 | Ma | G06K 9/00597 |

FOREIGN PATENT DOCUMENTS

| | | |
|---|---|---|
| KR | 10-2014-0024707 A | 3/2014 |
| KR | 10-2015-0049045 A | 5/2015 |

OTHER PUBLICATIONS

European Patent Office, "Partial European Search Report," Application No. EP 18154894.2, dated May 30, 2018, 17 pages.

* cited by examiner

| ENVIRONMENT | | CURRENT(mA) | on pixel | LCD BRIGHTNESS BY ILLUMINANCE | |
|---|---|---|---|---|---|
| | | | | Default (DragX) | |
| | | | | ILLUMINANCE | BRIGHTNESS |
| EXTREMELY LOW ILLUMINANCE | LEVEL 1 | 12mA | 65000ea | 3 | 14 |
| | | | | 4 | 15 |
| | | | | 5 | 18 |
| | | | | 6 | 21 |
| | | | | 7 | 24 |
| | | | | 8 | 26 |
| LOW ILLUMINANCE | LEVEL 2 | 6mA | 325000ea | 9 | 31 |
| | | | | 10 | 35 |
| | | | | 11 | 39 |
| | | | | 12 | 42 |
| | | | | 13 | 48 |
| | | | | 18 | 61 |
| | | | | 23 | 75 |
| | | | | 28 | 86 |
| | | | | 53 | 99 |
| NORMAL INDOOR | LEVEL 3 | 1mA | 6500ea | 103 | 103 |
| | | | | 404 | 132 |
| | | | | 503 | 161 |
| BRIGHT INDOOR | LEVEL 4 | 0.5mA | 3200ea | 1003 | 217 |
| | | | | 1503 | 300 |
| | | | | 2003 | 362 |
| CLOUDY OR OVERCAST DAY | LEVEL 5 | 0.25mA | 3200ea | 3003 | 433 |
| | | | | 4003 | 454 |
| | | | | 5004 | 474 |
| | | | | 10003 | 495 |
| SUNNY DAY | LEVEL 6 | 0.1mA | 1000ea | 20003 | 516 |
| | | | | 30003 | 537 |
| | | | | 40004 | 557 |
| | AOD (Always On Display) | 0.01mA | 10ea | Display ON/OFF | |

FIG.5

| DIFFERENCE BETWEEN FIRST TIME AND SECOND TIME (ΔT) | DISTANCE (RANGE) | On pixel |
|---|---|---|
| a1 | LEVEL 1 | 1000ea |
| a2 | LEVEL 2 | 1500ea |
| a3 | LEVEL 3 | 2000ea |
| a4 | LEVEL 4 | 25000ea |
| ⋮ | ⋮ | ⋮ |

ELECTRONIC DEVICE AND METHOD FOR PREVENTING CURRENT CONSUMPTION BY ELECTRONIC DEVICE

CROSS-REFERENCE TO RELATED APPLICATION

This application is related to and claims priority under 35 U.S.C. § 119(a) to Korean Patent Application No. 10-2017-0015394 filed on Feb. 3, 2017, the entire content of which is hereby incorporated by reference.

TECHNICAL FIELD

Various exemplary embodiments relate to an electronic device and a method for preventing current consumption by an electronic device.

Background

Electronic devices are provided with an illumination sensor capable of measuring ambient brightness in order to adjust the brightness of a display. The illumination sensor is positioned above a bezel on the front of an electronic device, and a hole is provided above the bezel on the front of the electronic device to secure transmittance for the illumination sensor.

SUMMARY

It is possible to include a function of an illumination sensor in a camera unit disposed at the front of an electronic device, instead of providing a separate illumination sensor, in order to minimize the size of a hole in the electronic device, in which case current consumption may increase when constant operation thereof is needed.

Various exemplary embodiments of the present disclosure provide an electronic device and a method for preventing current consumption by an electronic device, which are capable of optimizing current consumption when the electronic device has a camera unit including the function of an illumination sensor.

According to various exemplary embodiments of the present disclosure, an electronic device may include: a camera unit; and a data processing unit that is electrically connected to the camera unit, wherein the data processing unit may detect a first number of pixels, corresponding to first illuminance data, based on first pixel data received from the camera unit, and transmit the first number of pixels to the camera unit, and may determine the brightness of a display, corresponding to second illuminance data, based on second pixel data received from the camera unit with a sensor corresponding to the first number of pixels turned on.

According to various exemplary embodiments of the present disclosure, a method for preventing current consumption by an electronic device may include: transmitting a first number of pixels to a camera unit by detecting the first number of pixels corresponding to first illuminance data based on first pixel data received from the camera unit; and determining the brightness of a display corresponding to second illuminance data based on second pixel data received from the camera unit in which a sensor corresponding to the first number of pixels is turned on.

An electronic device and a method for preventing current consumption by an electronic device according to various exemplary embodiments may optimize current consumption when the electronic device has a camera unit including the function of an illumination sensor.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5 illustrates a table including the number of pixels corresponding to illuminance data stored in a memory of an electronic device according to various exemplary embodiments of the present disclosure;

DETAILED DESCRIPTION

Figure 1:
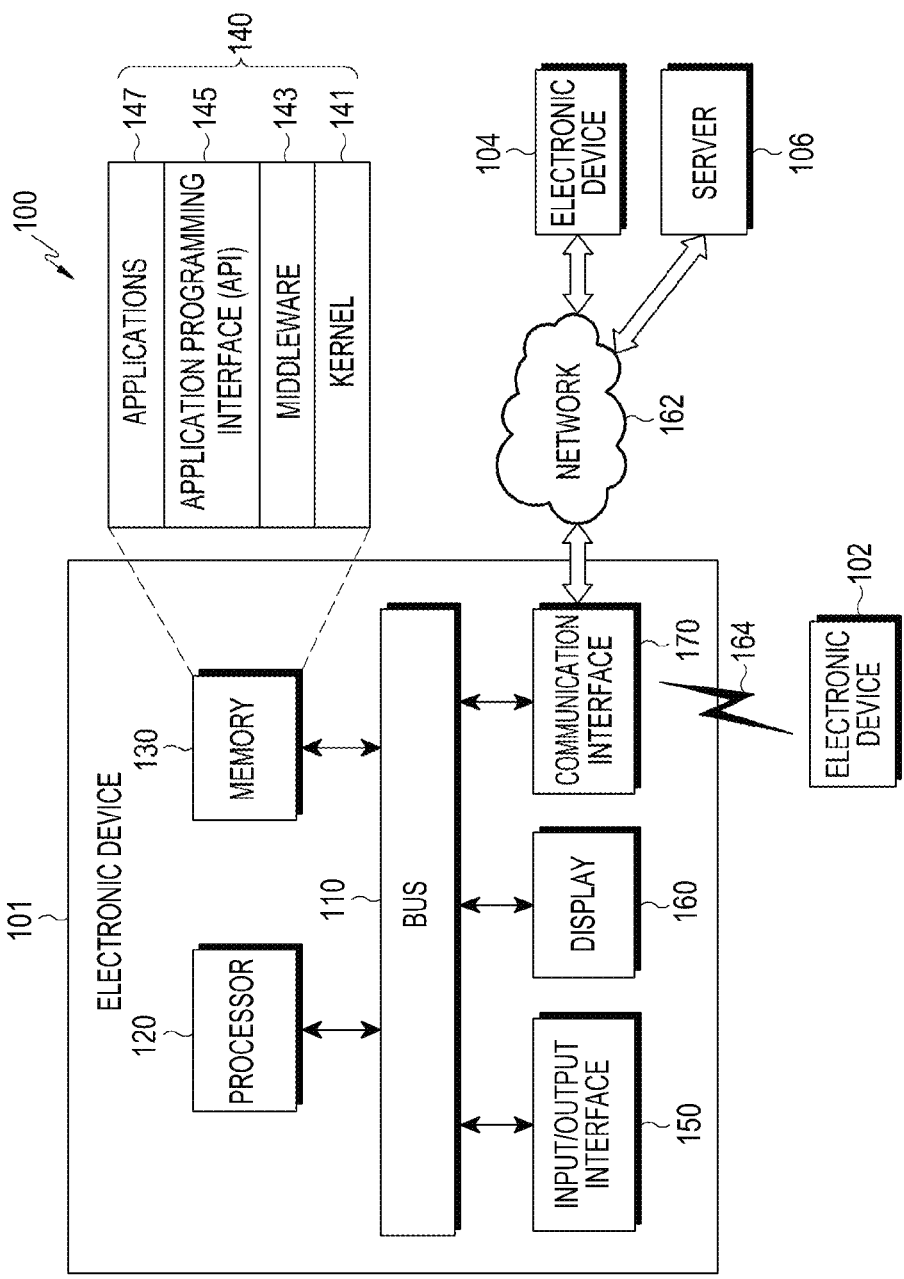
FIG. 1 illustrates a network environment according to various exemplary embodiments.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" may include (1) at least one A, (2) at least one B, or (3) both at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

As used herein, the expression "configured to" may be interchangeably used with the expression "suitable for", "having the capability to", "designed to", "adapted to", "made to", or "capable of". The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used herein are merely for the purpose of describing particular embodiments and are not intended to limit the scope of other embodiments. { } A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

FIG. 1 illustrates an electronic device 101 in a network environment 100 according to various exemplary embodiments. The electronic device 101 may include a bus 110, a processor 120, a memory 130, an input/output interface 150, a display 160, and a communication interface 170. In some embodiments, at least one of the components may be omitted, or additional components may be further included in the electronic device 101.

The bus 110 may include, for example, a circuit that connects the components 120, 130, and 150 to 170 to each other and delivers communications (for example, control messages and/or data) between the components.

The processor 120 may include one or more of a Central Processing Unit (CPU), an Application Processor (AP), and a Communication Processor (CP). The processor 120 may control, for example, at least one different component of the electronic device 101, and/or may perform operations relating to communication or data processing. The processor 120 may be referred to as a control circuit (controller), may include the control circuit as a part thereof, or may constitute the control circuit.

The memory 130 may include a volatile and/or nonvolatile memory. The memory 130 may store, for example, a command or data related to at least one different component of the electronic device 101. According to one exemplary embodiment, the memory 130 may store software and/or a program 140. The program 140 may include, for example, a kernel 141, middleware 143, an Application Programming Interface (API) 145, and/or an application (or "app") 147. At least part of the kernel 141, the middleware 143, and the API 145 may be designated as an Operating System (OS).

The kernel 141 may control or manage system resources (for example, the bus 110, the processor 120, the memory 130, or the like) used to perform an operation or function implemented in other programs (for example, the middleware 143, the API 145, or the application 147). Further, the kernel 141 may provide an interface that allows the middleware 143, the API 145, or the application 147 to access individual components of the electronic device 101 to thereby control or manage system resources.

The middleware 143 may serve as a relay so that, for example, the API 145 or the application 147 communicates with the kernel 141 to exchange data.

Further, the middleware 143 may process one or more requests for operations received from the application 147 according to the priority thereof. For example, the middleware 143 may assign at least one application 147 a priority for using a system resource of the electronic device 101 (for example, the bus 110, the processor 120, the memory 130, or the like). For example, the middleware 143 may process the one or more requests for operations according to the priority assigned to the at least one application, thereby performing scheduling or load balancing for the one or more requests for operations.

The API 145 is, for example, an interface for the application 147 to control a function provided from the kernel 141 or the middleware 143, and may include, for example, at least one interface or function (for example, a command) for file control, window control, image processing, or text control.

The input/output interface 150 may serve as an interface that delivers a command or data, which is input from, for example, a user or a different external device, to a different component(s) of the electronic device 101. Further, the input/output interface 150 may output a command or data, which is received from a different component(s) of the electronic device 101, to the user or to the different external device.

The display 160 may include, for example, a Liquid Crystal Display (LCD), a Light-Emitting Diode (LED) display, an Organic Light-Emitting Diode (OLED) display, a Micro-Electro-Mechanical Systems (MEMS) display, or an electronic paper display. The display 160 may display, for example, various types of content (for example, text, an image, a video, an icon, a symbol, or the like) for the user. The display 160 may include a touch screen and may receive touch, gesture, proximity, or hovering input using, for example, an electronic pen or a body part of a user.

The communication interface 170 may establish communication, for example, between the electronic device 101 and an external device (for example, a first external electronic device 102, a second external electronic device 104, or a server 106). For example, the communication interface 170 may be connected to a network 162 via wireless communication or wired communication to communicate with the external device (for example, the second external electronic device 104 or the server 106). The communication interface 170 may include a Communication Processor (CP), and the CP may form one of a plurality of modules constituting the communication interface 170. In one exemplary embodiment, the CP may be included in the processor 120.

The wireless communication may use, for example, a cellular communication protocol, which may be, for example, at least one of Long-Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), and Global System for Mobile Communications (GSM). Further, the wireless communication may include, for example, short-range communication 164. The short-range communication 164 may include, for example, at least one of Wireless Fidelity (Wi-Fi), Bluetooth, Near-Field Communication (NFC), and Global Navigation Satellite System (GNSS). The GNSS may include, for example, at least one of a Global Positioning System (GPS), a Global Navigation Satellite System (GNSS), a BeiDou Navigation Satellite System (hereinafter, "BeiDou"), and Galileo, which is the European global satellite-based navigation system, depending on the use area or bandwidth. In the present document, "GPS" may be interchangeably used with "GNSS" hereinafter. The wired communication may include, for example, at least one of Universal Serial Bus (USB), High-Definition Multimedia Interface (HDMI), Recommended Standard 232 (RS-232), and Plain Old Telephone Service (POTS). The network 162 may include a telecommunications network, which may be, for example, at least one of a computer network (for example, a Local Area Network (LAN) or Wide Area Network (WAN)), the Internet, and a telephone network.

Each of the first and second external electronic devices 102 and 104 may be a device of a type that is the same as, or different from, that of the electronic device 101. According to one exemplary embodiment, the server 106 may include a group of one or more servers. According to various exemplary embodiments, all or some of the operations performed in the electronic device 101 may be performed in another electronic device or a plurality of electronic devices (for example, the electronic devices 102 and 104 or the server 106). According to one exemplary embodiment, when the electronic device 101 needs to perform a function or service automatically or upon request, the electronic device 101 may request another electronic device (for example, the electronic device 102 or 104, or the server 106) to perform at least some functions related to the function or service, instead of, or in addition to, autonomously performing the function or service. The other electronic device (for example, the electronic device 102 or 104, or the server 106) may perform the requested functions or additional functions and may transmit the result thereof to the electronic device 101. The electronic device 101 may provide the requested function or service using the same received result or after additionally processing the result. To this end, cloud-computing, distributed-computing, or client-server-computing technologies may be used.

Figure 2:
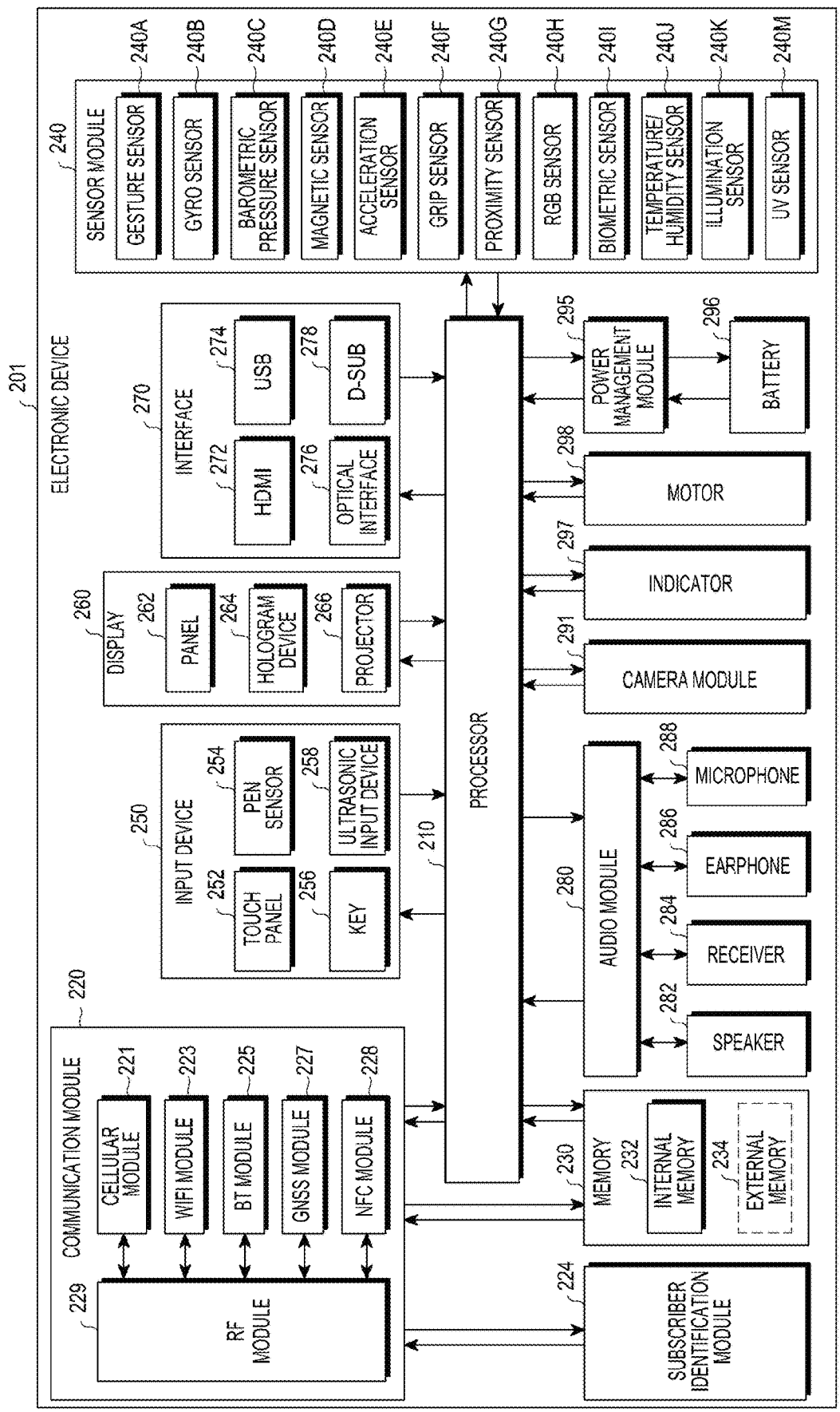
FIG. 2 illustrates a block diagram of an electronic device according to various exemplary embodiments.

FIG. 2 illustrates a block diagram of an electronic device 201 according to various exemplary embodiments. The electronic device 201 may include, for example, all or part of the electronic device 101 illustrated in FIG. 1. The electronic device 201 may include one or more processors (for example, Application Processors (APs)) 210, a communication module 220, a memory 230, a sensor module 240, an input device 250, and a display 260. The electronic device 201 may further include at least one of a Subscriber Identification Module (SIM) 224, an interface 270, an audio module 280, a camera module 291, a power management module 295, a battery 296, an indicator 297, and a motor 298.

The processors 210 may run, for example, an operating system or an application to control a plurality of hardware or software components that are connected to the processors 210, and may perform various kinds of data processing and operations. The processors 210 may be configured, for example, as a System on Chip (SoC). According to one exemplary embodiment, the processors 210 may further include a Graphic Processing Unit (GPU) and/or an image signal processor. The processors 210 may include at least some (for example, a cellular module 221) of the components illustrated in FIG. 2. The processors 210 may load a command or data received from at least one of other components (for example, nonvolatile memory) into volatile memory to process the command or data, and may store various types of data in the nonvolatile memory.

The communication module 220 may have a configuration that is the same as, or similar to, that of the communication interface 170 in FIG. 1. The communication module 220 may include, for example, at least one of a cellular module 221, a Wi-Fi module 223, a Bluetooth module 225, a global navigation satellite system (GNSS) module 227 (for example, a global positioning system (GPS) module, a GLONASS module, a BeiDou module, or a Galileo module), a Near-Field Communication (NFC) module 228, and a radio frequency (RF) module 229.

The cellular module 221 may provide, for example, a voice call, a video call, a text messaging service, or an Internet service through a communication network. According to one exemplary embodiment, the cellular module 221 may perform identification and authentication of the electronic device 201 in a communication network using a Subscriber Identity Module (SIM, for example, a SIM card) 224. According to one exemplary embodiment, the cellular module 221 may perform at least some of the functions provided by the processors 210. According to one exemplary embodiment, the cellular module 221 may include a Communication Processor (CP).

The Wi-Fi module 223, the Bluetooth module 225, the GNSS module 227, and the NFC module 228 may each include a processor to process data transmitted and received via the respective modules. According to one exemplary embodiment, at least some (for example, two or more) of the cellular module 221, the Wi-Fi module 223, the Bluetooth module 225, the GNSS module 227, and the NFC module 228 may be included in one Integrated Chip (IC) or IC package.

The RF module 229 may transmit and receive, for example, a communication signal (for example, an RF signal). The RF module 229 may include, for example, a transceiver, a Power Amplifier (amp) Module (PAM), a frequency filter, a Low-Noise Amplifier (LNA), an antenna, or the like. According to another embodiment, at least one of the cellular module 221, the Wi-Fi module 223, the Bluetooth module 225, the GNSS module 227, and the NFC module 228 may transmit and receive an RF signal through a separate RF module.

The SIM 224 may include, for example, a card including a SIM and/or an embedded SIM, and may include unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 and/or an external memory 234. The internal memory 232 may include, for example, at least one of a volatile memory (for example, a Dynamic Random-Access Memory (DRAM), a Static RAM (SRAM), a Synchronous Dynamic RAM (SDRAM), or the like) and a nonvolatile memory (for example, a One-Time Programmable Read-Only Memory (OTPROM), a Programmable ROM (PROM), an Erasable And Programmable ROM (EPROM), an Electrically Erasable and a Programmable ROM (EEPROM), a mask ROM, a flash ROM, a flash memory (for example, an NAND flash, an NOR flash, or the like), a hard drive, or a Solid-State Drive (SSD)).

The external memory 234 may further include a flash drive, for example, a Compact Flash (CF), a Secure Digital (SD), a micro Secure Digital (micro-SD), a mini Secure Digital (mini-SD), an extreme digital (xD), a Multi-Media Card (MMC), a memory stick, or the like. The external memory 234 may be functionally and/or physically connected to the electronic device 201 through any of various interfaces.

The sensor module 240 may measure, for example, physical quantities, or may detect the state of operation of the electronic device 201 and convert measured or detected information into an electrical signal. The sensor module 240 may include, for example, at least one of a gesture sensor 240A, a gyro sensor 240B, a barometric pressure sensor 240C, a magnetic sensor 240D, an accelerometer 240E, a grip sensor 240F, a proximity sensor 240G a color sensor 240H (for example, a red, green, and blue (RGB) sensor), a biometric sensor 240I, a temperature/humidity sensor 240J, a illumination sensor 240K and an ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit to control at least one or more sensors belonging thereto. In one exemplary embodiment, the electronic device 201 may further include a processor configured, as a part of the processors 210 or separately from the processors 210, to control the sensor module 240, thereby controlling the sensor module 240 while the processors 210 are in a sleep state.

The input device 250 may include, for example, a touch panel 252, and may further include at least one of a (digital) pen sensor 254, a key 256, or an ultrasonic input device 258. The touch panel 252 may be, for example, at least one of an electrostatic type, a pressure-sensitive type, an infrared type, and an ultrasonic type. Further, the touch panel 252 may further include a control circuit. The touch panel 252 may further include a tactile layer to provide a user with a tactile response.

The (digital) pen sensor 254 may, for example, be part of the touch panel or may include a separate recognition sheet. The key 256 may include, for example, a physical button, an optical key, or a keypad. The ultrasonic input device 258 may detect ultrasonic waves generated in an input tool through a microphone (for example, a microphone 288) and may identify data corresponding to the detected ultrasonic waves.

The display 260 (for example, a display 160) may include a panel 262 and may further include a hologram device 264 and/or a projector 266. The panel 262 may include a configuration that is the same as, or similar to, that of the display 160 of FIG. 1. The panel 262 may be configured, for example, to be flexible, transparent, or wearable. The panel 262 may be formed with the touch panel 252 in a single module. The hologram device 264 may display a three-dimensional image in the air using light interference. The projector 266 may project light onto a screen to display an image. The screen may be disposed, for example, inside or outside the electronic device 201. According to one exemplary embodiment, the display 260 may further include a control circuit to control the panel 262, the hologram device 264, or the projector 266.

The interface 270 may include, for example, at least one of a High-Definition Multimedia Interface (HDMI) 272, a Universal Serial Bus (USB) 274, an optical interface 276, and a D-subminiature (D-sub) interface 278. The interface 270 may be included, for example, in the communication interface 170 illustrated in FIG. 1. Additionally or alternatively, the interface 270 may include, for example, a Mobile High-Definition Link (MHL) interface, a Secure Digital (SD) card/Multi-Media Card (MMC) interface, or an Infrared Data Association (IrDA) interface.

The audio module 280 may bidirectionally convert, for example, a sound and an electrical signal. At least some components of the audio module 280 may be included, for example, in the input/output interface 150 illustrated in FIG. 1. The audio module 280 may process sound information input or output, for example, through a speaker 282, a receiver 284, earphones 286, or the microphone 288.

The camera module 291 is a device that takes, for example, a still image and a video. According to one exemplary embodiment, the camera module 291 may include one or more image sensors (for example, a front sensor or a rear sensor), a lens, an Image Signal Processor (ISP), or a flash (for example, an LED, a xenon lamp, or the like).

The power management module 295 may manage, for example, the power of the electronic device 201. According to one exemplary embodiment, the power management module 295 may include a Power Management Integrated Circuit (PMIC), a charger Integrated Circuit (IC), or a battery or fuel gauge. The PMIC may have wired and/or wireless charging methods. The wireless charging methods may include, for example, a magnetic resonance method, a magnetic induction method, or an electromagnetic wave method, and may further include an additional circuit for wireless charging, such as a coil loop, a resonance circuit, or a rectifier. The battery gauge may measure, for example, the remaining battery charge, the charging voltage, the current, or temperature of the battery 296. The battery 296 may include, for example, a rechargeable battery and/or a solar battery.

The indicator 297 may display the specific state of the electronic device 201 or a component thereof (for example, the processors 210), which may be, for example, a booting state, a message state, or a charging state. The motor 298 may convert an electrical signal into mechanical vibrations, and may generate vibrations or a haptic effect. Although not shown, the electronic device 201 may include a processing device for supporting a mobile TV (for example, a GPU). The processing device for supporting the mobile TV may process media data in accordance with Digital Multimedia Broadcasting (DMB), Digital Video Broadcasting (DVB), or mediaFlo™ standards.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
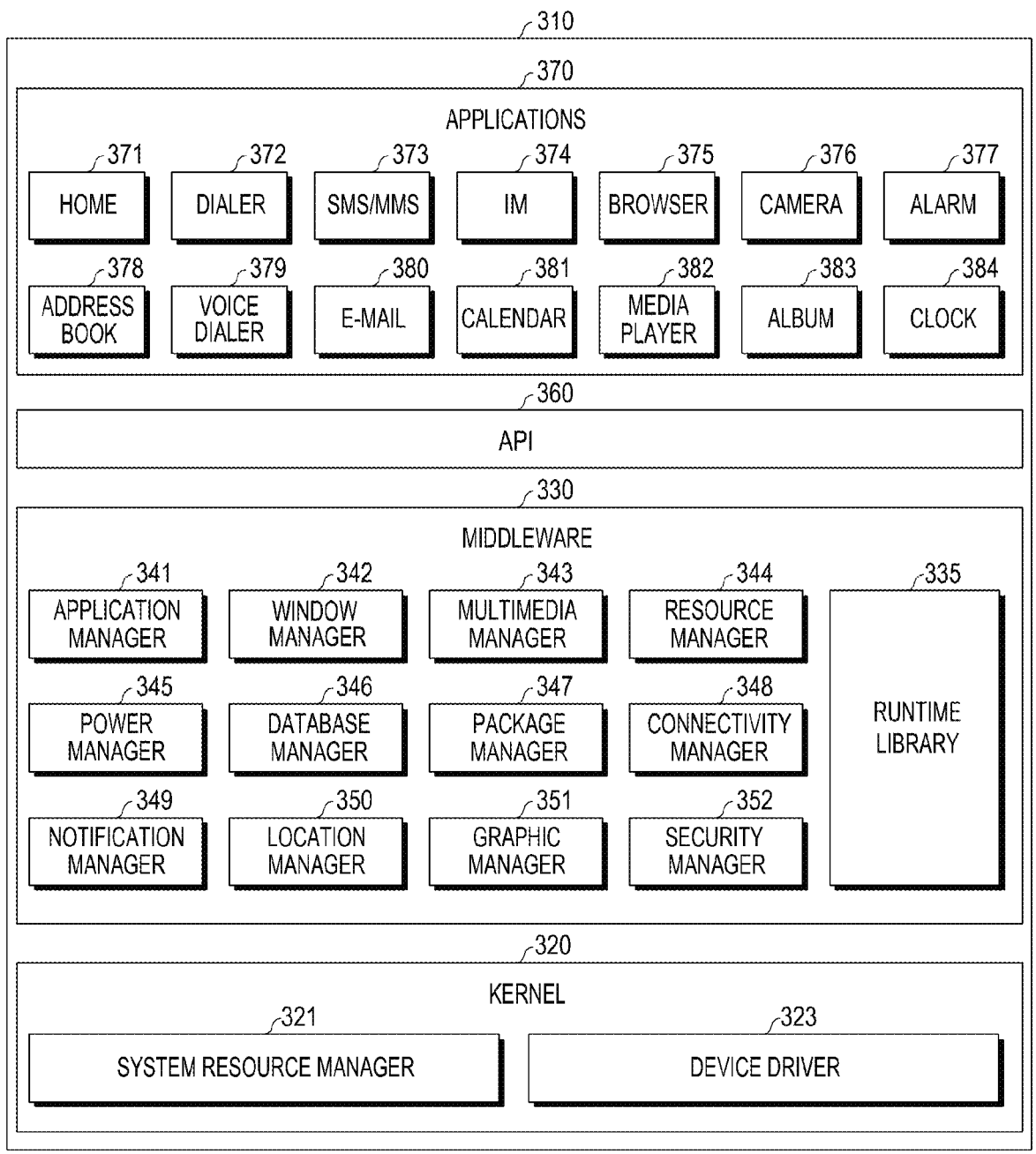
FIG. 3 illustrates a block diagram of a program module according to various exemplary embodiments.

FIG. 3 illustrates a block diagram of a program module according to various exemplary embodiments. According to one exemplary embodiment, the program module 310 (for example, the program 140) may include an Operating System (OS) that controls resources related to an electronic device (for example, the electronic device 101) and/or various applications (for example, the application 147) that run on the OS. The OS may be, for example, Android, iOS, Windows, Symbian, Tizen, Bada, or the like.

The program module 310 may include a kernel 320, middleware 330, an API 360, and/or an application 370. At least part of the program module 310 may be preloaded onto the electronic device, or may be downloaded from an external electronic device (for example, the electronic device 102 or 104, the server 106, or the like).

The kernel 320 (for example, the kernel 141) may include, for example, a system resource manager 321 and/or a device driver 323. The system resource manager 321 may perform control, allocation, or recovery of system resources. According to one exemplary embodiment, the system resource manager 321 may include a process management circuit, a memory management circuit, or a file-system management circuit. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide, for example, functions commonly used for applications 370, or may provide the applications 370 with various functions through the API 360 so that the applications 370 may efficiently use the limited systems resources in the electronic device. According to one exemplary embodiment, the middleware 330 (for example, the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a complier to add a new function through a programming language while the application 370 is running. The runtime library 335 may perform functions for input/output management, memory management, or arithmetic functions.

The application manager 341 may manage, for example, the life cycle of at least one application among the applications 370. The window manager 342 may manage graphic user interface (GUI) resources used for a screen. The multimedia manager 343 may identify formats that are used to play various media files, and may encode or decode a media file using a codec suitable for a corresponding format. The resource manager 344 may manage resources, such as a source code, a memory, or a storage space, for at least one application among the applications 370.

The power manager 345 may operate with, for example, a basic input/output system (BIOS) to manage a battery or power supply and may provide information on power used for operation of the electronic device. The database manager 346 may generate, retrieve, or change a database to be used for at least one application among the applications 370. The package manager 347 may install or update an application distributed in the form of a package file.

The connectivity manager 348 may manage wireless connectivity via, for example, Wi-Fi or Bluetooth. The notification manager 349 may display or report an incoming message, an appointment, and an event including a proximity notification in a manner that does not disturb a user. The location manager 350 may manage location information on the electronic device. The graphic manager 351 may manage a graphic effect to be provided for the user or a user interface related to the graphic effect. The security manager 352 may provide overall security functions used for system security or user authentication. According to one exemplary embodiment, when the electronic device (for example, the electronic device 101) has phone features, the middleware 330 may further include a telephony manager to manage a voice or video call function of the electronic device.

The middleware 330 may include a middleware module that forms combinations of various functions of the foregoing components. The middleware 330 may provide a specialized module for each type of OS in order to provide differentiated functions. Further, the middleware 330 may dynamically delete some of the existing components or add new components.

The API 360 (for example, the API 145) is, for example, a set of API programming functions, and may be provided with a different configuration depending on the OS. For example, one API set for each platform may be provided in the case of Android or iOS, while two or more API sets for each platform may be provided in the case of Tizen.

The application 370 (for example, the application 147) may include one or more applications that are capable of performing functions of, for example, a home screen 371, a dialer 372, SMS/MMS 373, instant messaging (IM) 374, a browser 375, a camera 376, an alarm 377, an address book 378, a voice dialer 379, email 380, a calendar 381, a media player 382, an album 383, a clock 384, or health care (for example, for measuring exercising or blood sugar), an environmental data application (for example, for providing atmospheric pressure, humidity, or temperature data), or the like.

According to one exemplary embodiment, the application 370 may include an application (hereinafter, "information exchange application" for convenience of description) that supports information exchange between the electronic device (for example, the electronic device 101) and an external electronic device (for example, the electronic device 102 or 104). The information exchange application may include, for example, a notification relay application for relaying specific information to the external electronic device or a device management application for managing the external electronic device.

For example, the notification relay application may include a function of relaying notification information, which is generated in another application (for example, the SMS/MMS application, the email application, the health care application, the environmental data application, or the like) of the electronic device, to the external electronic device (for example, the electronic device 102 or 104). Additionally, the notification relay application may receive notification information, for example, from the external electronic device and may provide the notification information to the user.

The device management application may manage (for example, install, delete, or update), for example, at least one function (for example, a function of turning on/turning off the external electronic device itself (or some components) or adjusting the brightness (or resolution) of a display) of the external electronic device (for example, the electronic device 102 or 104) communicating with the electronic device, an application operating in the external electronic device, or a service (for example, a call service or message service) provided by the external electronic device.

According to one exemplary embodiment, the application 370 may include an application (for example, a health care application of a mobile medical device) assigned according to the attributes of the external electronic device (for example, the electronic device 102 or 104). According to one exemplary embodiment, the application 370 may include an application received from the external electronic device (for example, the server 106 or the electronic device 102 or 104). According to one exemplary embodiment, the application 370 may include a preloaded application or a third-party application that may be downloaded from a server. The illustrated components of the program module 310, according to the embodiments, may be termed differently depending on the OS.

According to various exemplary embodiments, at least part of the program module 310 may be implemented in software, firmware, hardware, or combinations of at least two or more thereof. At least part of the program module 310 may be implemented (for example, run) by, for example, a processor (for example, the processor 210). At least part of the program module 310 may include, for example, a module, a program, a routine, sets of instructions, or a process to perform one or more functions.

Figure 4:
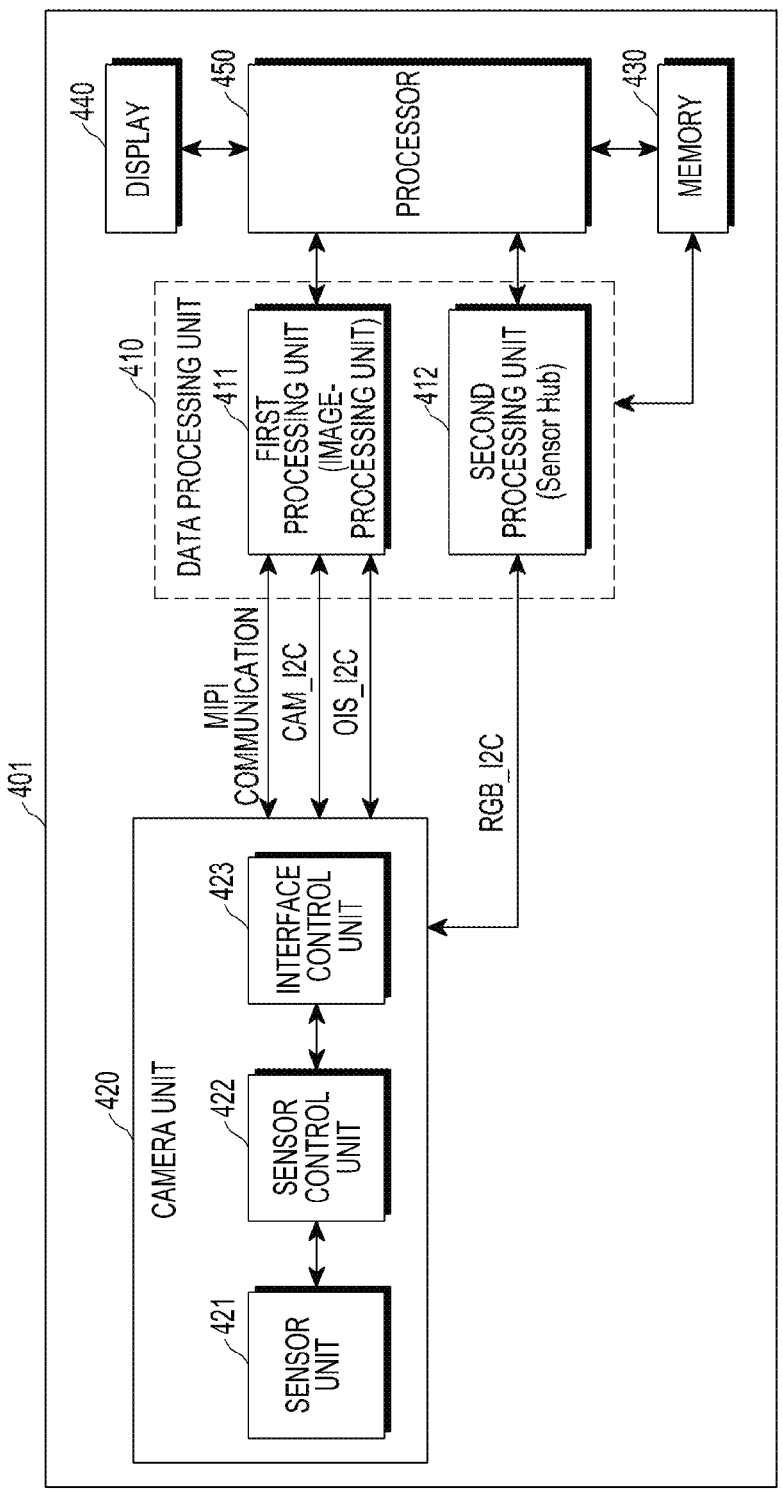
FIG. 4 illustrates a configuration of an electronic device according to various exemplary embodiments of the present disclosure.

FIG. 4 illustrates the configuration of an electronic device according to various exemplary embodiments of the present disclosure.

Referring to FIG. 4, the electronic device 401 (the electronic device 101 of FIG. 1) may include a data processing unit 410, a camera unit 420, a memory 430, a display 440, and a processor 450.

According to various exemplary embodiments, the data processing unit 410 detects the first number of pixels based on first pixel data received from the camera unit 420 and transmits the first number of pixels to the camera unit 420. The data processing unit 410 may determine the brightness of the display 440 based on second pixel data received from the camera unit 420 in which a sensor corresponding to the first number of pixels is turned on.

According to one exemplary embodiment, when first pixel data is received from the camera unit 420 in which a sensor corresponding to the default number of pixels is turned on, the data processing unit 410 may detect first illuminance data based on the first pixel data. For example, the data processing unit 410 may detect pixel data for illuminance data among the first pixel data and may generate the first illuminance data based on the detected pixel data. The data processing unit 410 may detect the first number of pixels corresponding to the first illuminance data from a table storing the number of pixels corresponding to illuminance data stored in the memory 430 and may transmit the detected first number of pixels to the camera unit 420. The data processing unit 410 or the processor 450, having received the first number of pixels from the data processing unit 410, may control a sensor control unit 422 of the camera unit 420 in order to turn on sensors corresponding to the first number of pixels.

According to one exemplary embodiment, when second pixel data is received from the camera unit 420 in which the sensors corresponding to the first number of pixels are turned on, the data processing unit 410 may generate second illuminance data based on the second pixel data. The data processing unit 410 may detect the brightness value of the display corresponding to the second illuminance data from the table storing the number of pixels corresponding to illuminance data stored in the memory 430, thereby determining the brightness of the display 440.

FIG. 5 illustrates a table including the number of pixels corresponding to illuminance data stored in a memory of an electronic device according to various exemplary embodiments of the present disclosure.

As illustrated in FIG. 5, the table storing the number of pixels corresponding to illuminance data includes an environment type, a level, consumed current, the number of pixels (on pixels), illuminance data, and a brightness value.

According to one exemplary embodiment, when the camera unit 420 disposed on the front of the electronic device has the function of an illumination sensor, the camera unit 420 may turn on a "6500ea" sensor corresponding to "6500ea", which is a default pixel number, may generate first pixel data based on an optical signal received from the "6500ea" sensor, and may transmit the first pixel data to the data processing unit 410. When first illuminance data generated based on the first pixel data is "1003", the data processing unit 410 may detect the first number of pixels "3200ea" corresponding to the first illuminance data "1003" from the table and may transmit the detected first number of pixels "3200ea" to the camera unit 420. Alternatively, the data processing unit 410 or the processor 450 having received the first number of pixels "3200ea" from the data processing unit 410 may control the sensor control unit 422 of the camera unit 420 in order to turn on sensors corresponding to the first number of pixels "3200ea".

The camera unit 420 may turn on a "3200ea" sensor corresponding to the first number of pixels "3200ea", may generate second pixel data based on an optical signal received from the "3200ea" sensor, and may transmit the second pixel data to the data processing unit 410.

When the second pixel data is received from the camera unit 420 and second illuminance data generated based on the second pixel data is "1503", the data processing unit 410 may detect a display brightness value "300" corresponding to the second illuminance data "1503" from the table and may determine the brightness value of the display 440 to be "300".

According to various exemplary embodiments, the data processing unit 410 may include a first processing unit 411 and a second processing unit 412.

According to one exemplary embodiment, the first processing unit 411 may include an image-processing unit, and the second processing unit 412 may include a sensor hub.

According to one exemplary embodiment, the first processing unit 411 may generate image data based on pixel data received from the camera unit 420 in a photographing mode of the electronic device. In a powered-on state of the electronic device, the second processing unit 412 may generate first illuminance data based on first pixel data received from the camera unit 420, may detect the first number of pixels corresponding to the first illuminance data and transmit the first number of pixels to the camera unit 420, may generate second illuminance data based on second pixel data received from the camera unit 420, and may determine the brightness value of the display corresponding to the second illuminance data.

According to one exemplary embodiment, the first processing unit 411 may generate image data based on pixel data received from the camera unit 420 in the photographing mode of the electronic device. In addition to generating the image data in the photographing mode of the electronic device, the first processing unit 411 may generate first illuminance data based on first pixel data received from the camera unit 420, may detect the first number of pixels corresponding to the first illuminance data and transmit the first number of pixels to the camera unit 420, may generate second illuminance data based on second pixel data received from the camera unit 420, and may determine the brightness value of the display corresponding to the second illuminance data. When the photographing mode of the electronic device is terminated, the second processing unit 412 may generate first illuminance data based on first pixel data received from the camera unit 420, may detect the first number of pixels corresponding to the first illuminance data and transmit the first number of pixels to the camera unit 420, may generate second illuminance data based on second pixel data received from the camera unit 420, and may determine the brightness value of the display corresponding to the second illuminance data.

According to one exemplary embodiment, in an awake mode of the electronic device, the first processing unit 411 may generate first illuminance data based on first pixel data received from the camera unit 420, may detect the first number of pixels corresponding to the first illuminance data and transmit the first number of pixels to the camera unit 420, may generate second illuminance data based on second pixel data received from the camera unit 420, and may determine the brightness value of the display corresponding to the second illuminance data.

According to one exemplary embodiment, in a sleep mode of the electronic device, the second processing unit 412 may generate first illuminance data based on first pixel data received from the camera unit 420, may detect the first number of pixels corresponding to the first illuminance data and transmit the first number of pixels to the camera unit 420, may generate second illuminance data based on second pixel data received from the camera unit 420, and may determine the brightness value of the display corresponding to the second illuminance data.

Figure 6A:
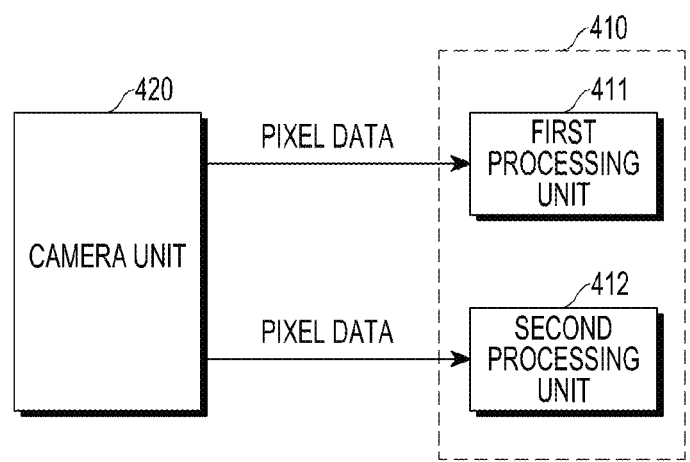
FIGS. 6A to 6C illustrate a pixel-data-processing operation in an electronic device according to various exemplary embodiments of the present disclosure.
Figure 6B:
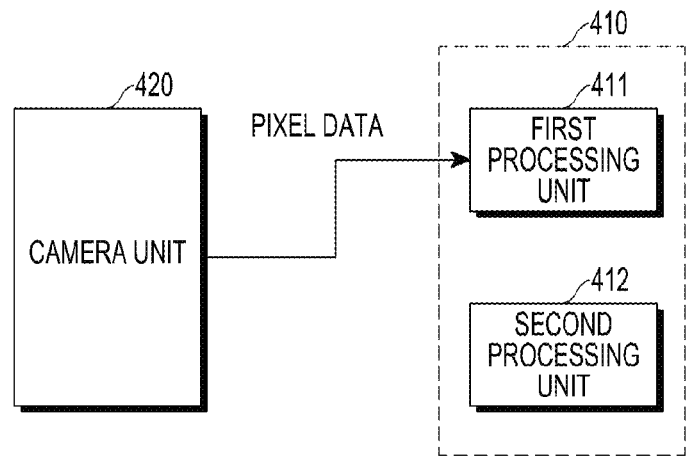
Figure 6C:
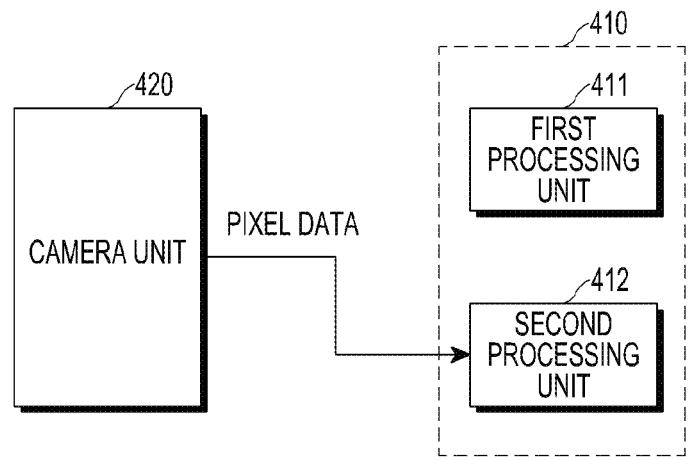

FIGS. 6A to 6C illustrate a pixel-data-processing operation in an electronic device according to various exemplary embodiments of the present disclosure.

As illustrated in FIG. 6A, in the photographing mode of the electronic device, the first processing unit 411 of the data processing unit 410 may receive pixel data (first pixel data or second pixel data) from the camera unit 420 and may generate image data based on the pixel data (first pixel data or second pixel data).

In the powered-on state of the electronic device, for example, in the photographing mode, upon termination of the photographing mode, in the awake mode, or in the sleep mode, the second processing unit 412 of the data processing unit 410 may receive pixel data (first pixel data or second pixel data) from the camera unit 420, may provide the optimum number of pixels corresponding to current illuminance data to the camera unit 420 based on the pixel data (first pixel data or second pixel data), and may determine the brightness of the display corresponding to the current illuminance data with a sensor corresponding to the optimum number of pixels turned on in the camera unit 420.

Alternatively, as illustrated in FIG. 6B, in the photographing mode of the electronic device, the first processing unit 411 of the data processing unit 410 may receive pixel data (first pixel data or second pixel data) from the camera unit 420, may generate image data based on the pixel data (first pixel data or second pixel data), may provide the optimum number of pixels corresponding to current illuminance data to the camera unit 420, and may determine the brightness of the display corresponding to the current illuminance data with a sensor corresponding to the optimum number of pixels turned on in the camera unit 420.

When the photographing mode of the electronic device in FIG. 6B is terminated, as illustrated in FIG. 6C, the second processing unit 412 of the data processing unit 410 may receive pixel data (first pixel data or second pixel data) from the camera unit 420, may provide the optimum number of pixels corresponding to current illuminance data to the camera unit 420 based on the pixel data (first pixel data or second pixel data), and may determine the brightness of the display corresponding to the current illuminance data with a sensor corresponding to the optimum number of pixels turned on in the camera unit 420.

Alternatively, as illustrated in FIG. 6B, in the awake mode of the electronic device, the first processing unit 411 of the data processing unit 410 may receive pixel data (first pixel data or second pixel data) from the camera unit 420, may provide the optimum number of pixels corresponding to current illuminance data to the camera unit 420 based on the pixel data (first pixel data or second pixel data), and may determine the brightness of the display corresponding to the current illuminance data with a sensor corresponding to the optimum number of pixels turned on in the camera unit 420.

As illustrated in FIG. 6C, in the sleep mode of the electronic device, the second processing unit 412 of the data processing unit 410 may receive pixel data (first pixel data or second pixel data) from the camera unit 420, may provide the optimum number of pixels corresponding to current illuminance data to the camera unit 420 based on the pixel data (first pixel data or second pixel data), and may determine the brightness of the display corresponding to the current illuminance data with a sensor corresponding to the optimum number of pixels turned on in the camera unit 420.

According to various exemplary embodiments, in the case in which the camera unit 420 disposed on the front of the electronic device has the function of an illumination sensor, when receiving the optimum first number of pixels corresponding to current illuminance data from the data processing unit 410 while turning on a sensor corresponding to the default number of pixels, the camera unit 420 may turn on a sensor corresponding to the first number of pixels.

According to one exemplary embodiment, the camera unit 420 may turn on sensors corresponding to the default number of pixels, may generate first pixel data based on an optical signal received from the sensors, and may transmit the generated first pixel data to the data processing unit 410.

According to one exemplary embodiment, when receiving the optimum first number of pixels corresponding to current illuminance data from the data processing unit 410 while turning on sensors corresponding to the default number of pixels, the camera unit 420 may turn on sensors corresponding to the first number of pixels by turning on or off a plurality of sensors corresponding to a plurality of pixels. While turning on the sensors corresponding to the first number of pixels, the camera unit 420 may generate second pixel data based on an optical signal received from the sensors and may transmit the second pixel data to the data processing unit 410.

According to various exemplary embodiments, the camera unit 420 may include a sensor unit 421, the sensor control unit 422, and an interface control unit 423.

According to various exemplary embodiments, the sensor unit 421 may include a plurality of pixels and a plurality of sensors to turn on or off the plurality of pixels.

According to one exemplary embodiment, the sensor unit 421 may include a Complementary Metal-Oxide Semiconductor (CMOS) sensor or a Change-Coupled Device (CCD) sensor.

According to various exemplary embodiments, the sensor control unit 422 may control the plurality of sensors corresponding to the plurality of pixels included in the sensor unit 421 and may generate pixel data based on an optical signal received from the sensor unit 421.

According to one exemplary embodiment, the sensor control unit 422 may control the plurality of sensors corresponding to the plurality of pixels included in the sensor unit 421 to be turned on or off.

According to one exemplary embodiment, when the electronic device is powered on, the sensor control unit 422 may turn on a sensor corresponding to the default number of pixels among the plurality of sensors of the sensor unit 421. While turning on the sensor corresponding to the default number of pixels, the sensor control unit 422 may generate first pixel data based on an optical signal received from the sensor and may transmit the first pixel data to the interface control unit 423.

According to one exemplary embodiment, when the optimum first number of pixels corresponding to current illuminance data is received from the interface control unit 423, the sensor control unit 422 may control the sensor unit 421 to turn on or off the plurality of sensors corresponding to the plurality of pixels, thereby turning on a sensor corresponding to the first number of pixels. While turning on the sensor corresponding to the first number of pixels, the sensor control unit 422 may generate second pixel data based on an optical signal received from the sensor and may transmit the second pixel data to the interface control unit 423.

According to various exemplary embodiments, the interface control unit 423 may transmit the first pixel data or the second pixel data, which is received from the sensor control unit 422, to the data processing unit 410, and may transmit the first number of pixels corresponding to the current illuminance data, which is received from the data processing unit 410, to the sensor control unit 422.

According to one exemplary embodiment, the interface control unit 423 may convert the first pixel data or the second pixel data, which is received from the sensor control unit 422, into a format for transmission via an I2C interface and may transmit the first pixel data or the second pixel data to the data processing unit 410 via the I2C interface.

According to various exemplary embodiments, the memory 430 may be, for example, the memory 130 illustrated in FIG. 1.

According to one exemplary embodiment, the memory 430 may store a table including the number of pixels corresponding to illuminance data, in which the number of pixels corresponding to the current illuminance data is stored.

According to various exemplary embodiments, the display 440 may be, for example, the display 160 illustrated in FIG. 1.

According to one exemplary embodiment, the display 440 may display information or data, with the brightness thereof adjusted to brightness determined by the data processing unit 410.

According to various exemplary embodiments, the processor 450 may be, for example, the processor 120 illustrated in FIG. 1.

According to one exemplary embodiment, the processor 450 may include the data processing unit 410, or may perform the same functions as the data processing unit 410.

According to one exemplary embodiment, the brightness of the display 440 may be adjusted based on brightness information on the display received from the data processing unit 410.

Figure 7:
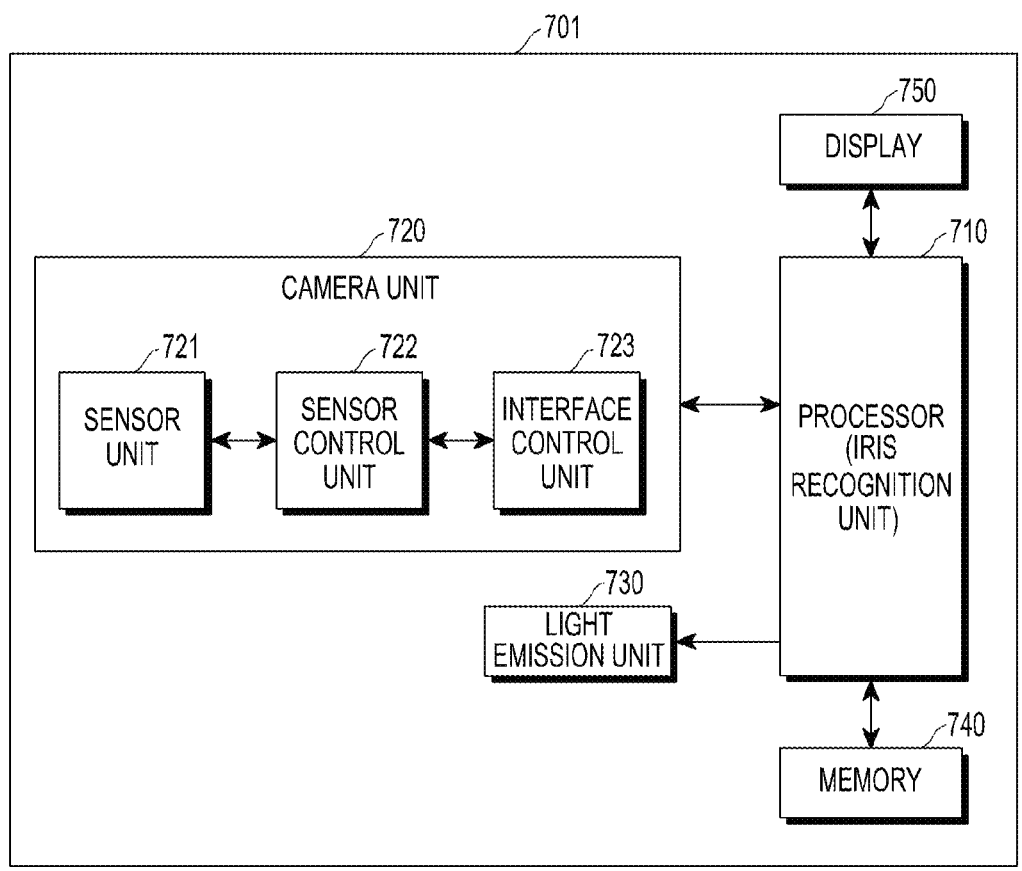
FIG. 7 illustrates a configuration of an electronic device according to various exemplary embodiments of the present disclosure.

FIG. 7 illustrates the configuration of an electronic device according to various exemplary embodiments of the present disclosure.

Referring to FIG. 7, the electronic device 701 (the electronic device 101 of FIG. 1 or the electronic device 401 of FIG. 4) may include a processor 710 (the processor 450 of FIG. 4), a camera unit 720 (the camera unit 420 of FIG. 4), a light emission unit 730, a memory 740 (the memory 430 of FIG. 4), and a display 750 (the display 440 of FIG. 4).

According to various exemplary embodiments, the processor 710 may adjust the number of pixels according to the distance between the electronic device 701 and the iris in an iris recognition mode.

According to one exemplary embodiment, the processor 710 may include an iris recognition unit.

According to one exemplary embodiment, when the electronic device switches to the iris recognition mode, the processor 710 may transmit, to the camera unit 720, a signal reporting the switch to the iris recognition mode.

According to one exemplary embodiment, in the iris recognition mode, the processor 710 may turn on the light emission unit 730 and may identify a first time, at which light is emitted from the light emission unit 730, and a second time, at which the light emitted from the light emission unit 730 reflected by the iris enters the camera unit 720. The processor 710 may calculate the difference $\Delta t$ between the first time and the second time.

The processor 710 may detect the optimum first number of pixels corresponding to the difference $\Delta t$ between the first time and the second time by referring to a table including the number of pixels corresponding to the distance in the iris recognition mode stored in the memory 740, and may transmit the optimum first number of pixels to the camera unit 720.

According to one exemplary embodiment, when pixel data is received from the camera unit 720 in which a sensor corresponding to the first number of pixels is turned on, the processor 710 may perform an iris recognition operation based on the pixel data.

Figures 8, 9:
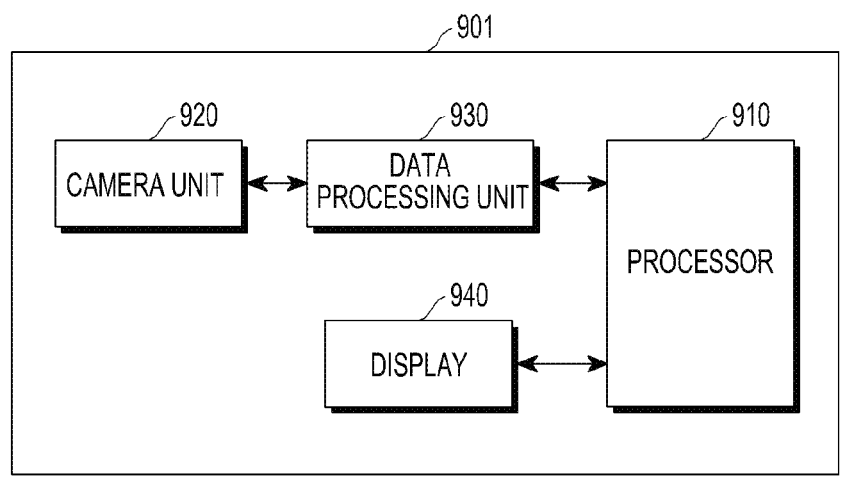
FIG. 8 illustrates a table including the number of pixels depending on distance in an iris recognition mode that is stored in a memory of an electronic device according to various exemplary embodiments of the present disclosure.
FIG. 9 illustrates the configuration of an electronic device according to various exemplary embodiments of the present disclosure.

FIG. 8 illustrates a table including the number of pixels corresponding to distance in the iris recognition mode that is stored in a memory of an electronic device according to various exemplary embodiments of the present disclosure.

As illustrated in FIG. 8, the table including the number of pixels corresponding to the distance in the iris recognition mode may include the difference $\Delta t$ between a first time and a second time, the distance, and the number of pixels (on pixels).

According to one exemplary embodiment, in the iris recognition mode, the processor 710 may calculate the difference $\Delta t$ between a first time, at which light is emitted from the light emission unit 730, and a second time, at which the light emitted from the light emission unit 730 and reflected by the iris enters the camera unit 720. When the calculated difference $\Delta t$ is "a1", which corresponds to a level 1 in which the distance between the electronic device 701 and the iris is short, the processor 710 may detect the first number of pixels "1000ea" and may transmit the first number of pixels to the camera unit 720.

According to various exemplary embodiments, when the optimum first number of pixels corresponding to the distance between the electronic device 701 and the iris is received from the processor 710 while turning on a sensor corresponding to the default number of pixels in the iris recognition mode, the camera unit 720 may turn on a sensor corresponding to the first number of pixels.

According to one exemplary embodiment, when the optimum first number of pixels corresponding to the distance between the electronic device 701 and the iris is received from the processor 710 while turning on a sensor corresponding to the default number of pixels, the camera unit 720 may turn on or off a plurality of sensors corresponding to a plurality of pixels, thereby turning on a sensor corresponding to the first number of pixels. While turning on the sensor corresponding to the first number of pixels, the camera unit 420 may generate pixel data based on infrared light of an optical signal received from the sensor and may transmit the pixel data to the processor 710.

According to various exemplary embodiments, the camera unit 720 may include a sensor unit 721, a sensor control unit 722, and an interface control unit 723.

According to various exemplary embodiments, the sensor unit 721 may include a plurality of pixels and a plurality of sensors to turn on or off the plurality of pixels.

According to one exemplary embodiment, the sensor unit 721 may include an infrared filter. When no infrared detection is needed, for example, when in a camera mode, the infrared filter may be closed by an actuator and may not be used. When infrared detection is used, for example, when in the iris recognition mode, the infrared filter may be opened by an actuator and may be used. Alternatively, the infrared filter may be provided in a portion of the sensor unit 721. Some pixels among the plurality of pixels included in the sensor unit 721 may be disposed in the infrared filter, and the other pixels among the plurality of pixels may be disposed in a portion where the infrared filter is absent. When no infrared detection is used, for example, when in the camera mode, the pixels disposed in the portion where the infrared filter is absent among the plurality of pixels may be used. When infrared detection is used, for example, when in the iris recognition mode, the pixels disposed in the infrared filter among the plurality of pixels may be used.

Alternatively, the plurality of pixels of the sensor unit 721 may include dedicated pixels for infrared detection. When the plurality of pixels includes the dedicated pixels for infrared detection, a separate filter capable of detecting infrared light from the dedicated pixels for infrared detection may be provided outside the sensor unit 721.

According to various exemplary embodiments, the sensor control unit 722 may control the plurality of sensors corresponding to the plurality of pixels included in the sensor unit 721 and may generate pixel data based on an optical signal received from the sensor unit 721.

According to one exemplary embodiment, the sensor control unit 722 may control the plurality of sensors corresponding to the plurality of pixels included in the sensor unit 721 to be turned on or off.

According to one exemplary embodiment, the sensor control unit 722 may receive the optimum first number of pixels corresponding to the distance between the electronic device and the iris from the interface control unit 723 while turning on the sensor corresponding to the default number of pixels among the plurality of sensors of the sensor unit 421 in the iris recognition mode. The sensor control unit 722 may turn on or off the plurality of sensors corresponding to the plurality of pixels, thereby turning on the sensor corresponding to the first number of pixels. While turning on the sensor corresponding to the first number of pixels, the sensor control unit 722 may detect infrared light (IR) of an optical signal received from the sensor. The sensor control unit 722 may generate the pixel data based on the infrared light and may transmit the generated pixel data to the interface control unit 723.

According to various exemplary embodiments, the interface control unit 723 may transmit the pixel data received from the sensor control unit 722 to the processor 710 and may transmit the first number of pixels corresponding to the distance between the electronic device and the iris, received from the processor 710, to the sensor control unit 722.

According to one exemplary embodiment, the interface control unit 723 may convert the pixel data received from the sensor control unit 722 into a format for transmission via the I2C interface and may transmit the pixel data to the processor 710 via the I2C interface.

According to various exemplary embodiments, the light emission unit 730 is an Infrared-Emitting Diode (IRED), which may be turned on or off by the processor 710. When the light emission unit 730 is turned on, the light emission unit 730 can radiate light with specific wavelengths, for example, light in the infrared band, to a subject.

According to various exemplary embodiments, the memory 740 may be, for example, the memory 130 illustrated in FIG. 1.

According to one exemplary embodiment, the memory 740 may store the table including the number of pixels corresponding to the distance in the iris recognition mode.

According to various exemplary embodiments, the display 750 may be, for example, the display 160 illustrated in FIG. 1.

According to one exemplary embodiment, the display 750 may display information indicating an iris recognition result in the iris recognition mode.

FIG. 9 illustrates the configuration of an electronic device according to various exemplary embodiments of the present disclosure.

Referring to FIG. 9, the electronic device 901 (the electronic device 101 of FIG. 1, the electronic device 401 of FIG. 4, and the electronic device 701 of FIG. 7) may include a processor 910 (the processor 450 of FIG. 4 and the processor 710 of FIG. 7), a camera unit 920 (the camera unit 420 of FIG. 4 and the camera unit 720 of FIG. 7), a data processing unit 930 (the data processing unit 410 of FIG. 4), and a display 940 (the display 440 of FIG. 4 and the display 750 of FIG. 7).

According to various exemplary embodiments, when illuminance data is unchanged for a certain period of time, the processor 910 may determine that there is no change in position, and may adjust the frame rate.

According to one exemplary embodiment, the processor 910 may reduce the number of frames at the frame rate by a predetermined number of frames at regular time intervals for the certain period of time for which the illuminance data is unchanged.

According to one exemplary embodiment, in the case where first illuminance data is detected and then second illuminance data is detected after a certain period of time, when the first illuminance data is the same as the second illuminance data, the processor 910 may reduce the number of frames at the frame rate by a predetermined number of frames. When third illuminance data detected after the predetermined period of time is the same as the first illuminance data or the second illuminance data, the processor 910 may further reduce the number of frames at the frame rate by a predetermined number of frames.

According to one exemplary embodiment, when the third illuminance data detected after the predetermined period of time is different from the first illuminance data or the second illuminance data, the processor 910 may adjust the frame rate to the default number of frames.

For example, when the first illuminance data and the second illuminance data are the same, the processor 910 may reduce the default number of frames at the frame rate, which is ten, to five. When the third illuminance data is the same as the first illuminance data or the second illuminance data, the processor 910 may reduce the number of frames at the frame rate from five to three. When the third illuminance data is different from the first illuminance data or the second illuminance data, the processor 910 may increase the number of frames at the frame rate from five back to ten.

According to various exemplary embodiments, the processor 910 may sequentially activate frames by a predetermined number of frames for the frame rate.

According to one exemplary embodiment, the processor 910 may divide the number of frames set as a default frame rate into the first number of frames and the second number of frames and may alternately activate the first number of frames and the second number of frames at regular time intervals. For example, when ten frames are set as the default frame rate, the processor 910 may classify a first frame, a third frame, a fifth frame, a seventh frame, and a ninth frame to belong to the first number of frames and may classify a second frame, a fourth frame, a sixth frame, an eighth frame, and a tenth frame to belong to the second number of frames. The processor 910 may repeat an operation of activating the first number of frames and deactivating the second number of frames and then, after a certain period of time, deactivating the first number of frames and activating the second number of frames.

According to various exemplary embodiments, the camera unit 920, which is the same as the camera unit 420 illustrated in FIG. 4 and the camera unit 720 illustrated in FIG. 7, may generate pixel data based on an optical signal received from a sensor and may transmit the generated pixel data to the data processing unit 930.

According to various exemplary embodiments, the data processing unit 930, which is the same as the data processing unit 410 illustrated in FIG. 4, may generate illuminance data based on the pixel data received from the camera unit 920 and may transmit the illuminance data to the processor 910.

According to various exemplary embodiments, the display 940 may be, for example, the display 160 illustrated in FIG. 1. According to one exemplary embodiment, the display 940 may display information on the frame rate under the control of the processor 910.

According to various exemplary embodiments, an electronic device may include: a camera unit 420 or 720; a processor 450, 710, or 910; and a data processing unit 410 that is electrically connected to the camera unit and the processor, wherein the data processing unit 410 may detect a first number of pixels corresponding to first illuminance data based on first pixel data received from the camera unit 420 and transmit the first number of pixels to the camera unit 420, and may determine the brightness of a display corresponding to second illuminance data based on second pixel data received from the camera unit 420 in which a sensor corresponding to the first number of pixels is turned on.

According to various exemplary embodiments, the data processing unit 410 may generate the first illuminance data based on the first pixel data received from the camera unit 420 in which a sensor corresponding to a default number of pixels is turned on, and may detect the first number of pixels corresponding to the first illuminance data.

According to various exemplary embodiments, the data processing unit 410 may generate the second illuminance data based on the second pixel data received from the camera unit 420 and may determine the brightness of the display based on the second illuminance data.

According to various exemplary embodiments, the data processing unit 410 may include: a first processing unit 411 that generates image data based on pixel data received from the camera unit 420; and a second processing unit 412 that detects the first number of pixels based on the first pixel data received from the camera unit 420 and determines the brightness of the display based on the second pixel data.

According to various exemplary embodiments, the data processing unit 410 may include: a first processing unit 411 that generates image data based on pixel data received from the camera unit 420 and determines the brightness of the display based on the first pixel data and the second pixel data received from the camera unit 420 in a photographing mode of the electronic device; and a second processing unit 412 that determines the brightness of the display based on the first pixel data and the second pixel data received from the camera unit 420 when the photographing mode of the electronic device is terminated.

According to various exemplary embodiments, the data processing unit 410 may include: a first processing unit 411 that determines the brightness of the display based on the first pixel data and the second pixel data that are received from the camera unit 420 in an awake mode of the electronic device; and a second processing unit 412 that determines the brightness of the display based on the first pixel data and the second pixel data that are received from the camera unit 420 in a sleep mode of the electronic device.

According to various exemplary embodiments, the camera unit 420 may: turn on a sensor corresponding to a default number of pixels to generate the first pixel data based on an optical signal received through the sensor and to transmit the first pixel data to the data processing unit 410; turn on the sensor corresponding to the first number of pixels received from the data processing unit 410; and generate the second pixel data based on an optical signal received through the sensor corresponding to the first number of pixels and transmit the second pixel data to the data processing unit 410.

According to various exemplary embodiments, the electronic device may further include a memory 430 that stores a table including a number of pixels corresponding to illuminance data.

According to various exemplary embodiments, the electronic device may further include a light emission unit 730 that emits light in an iris recognition mode, wherein the processor may detect the first number of pixels, corresponding to the distance between the electronic device and an iris in the iris recognition mode, and may transmit the first number of pixels to the camera unit so that the sensor corresponding to the first number of pixels is turned on in the camera unit 720.

According to various exemplary embodiments, a memory 740 of the electronic device may store a table including a number of pixels corresponding to a distance in an iris recognition mode.

According to various exemplary embodiments, the processor 710 may detect the first number of pixels corresponding to a difference between a first time, at which light is emitted from the light emission unit 730, and a second time, at which the light emitted from the light emission unit 730 and reflected by the iris=enters the camera unit 720.

According to various exemplary embodiments, the processor 910 may adjust a frame rate when illuminance data is unchanged for a certain period of time.

According to various exemplary embodiments, the processor 910 may reduce a number of frames at the frame rate by a predetermined number of frames at regular time intervals for the certain period of time in which the illuminance data is unchanged.

According to various exemplary embodiments, the processor 910 may classify a frame rate into a first number of frames and a second number of frames and alternately activate the first number of frames and the second number of frames at regular time intervals.

Figure 10:
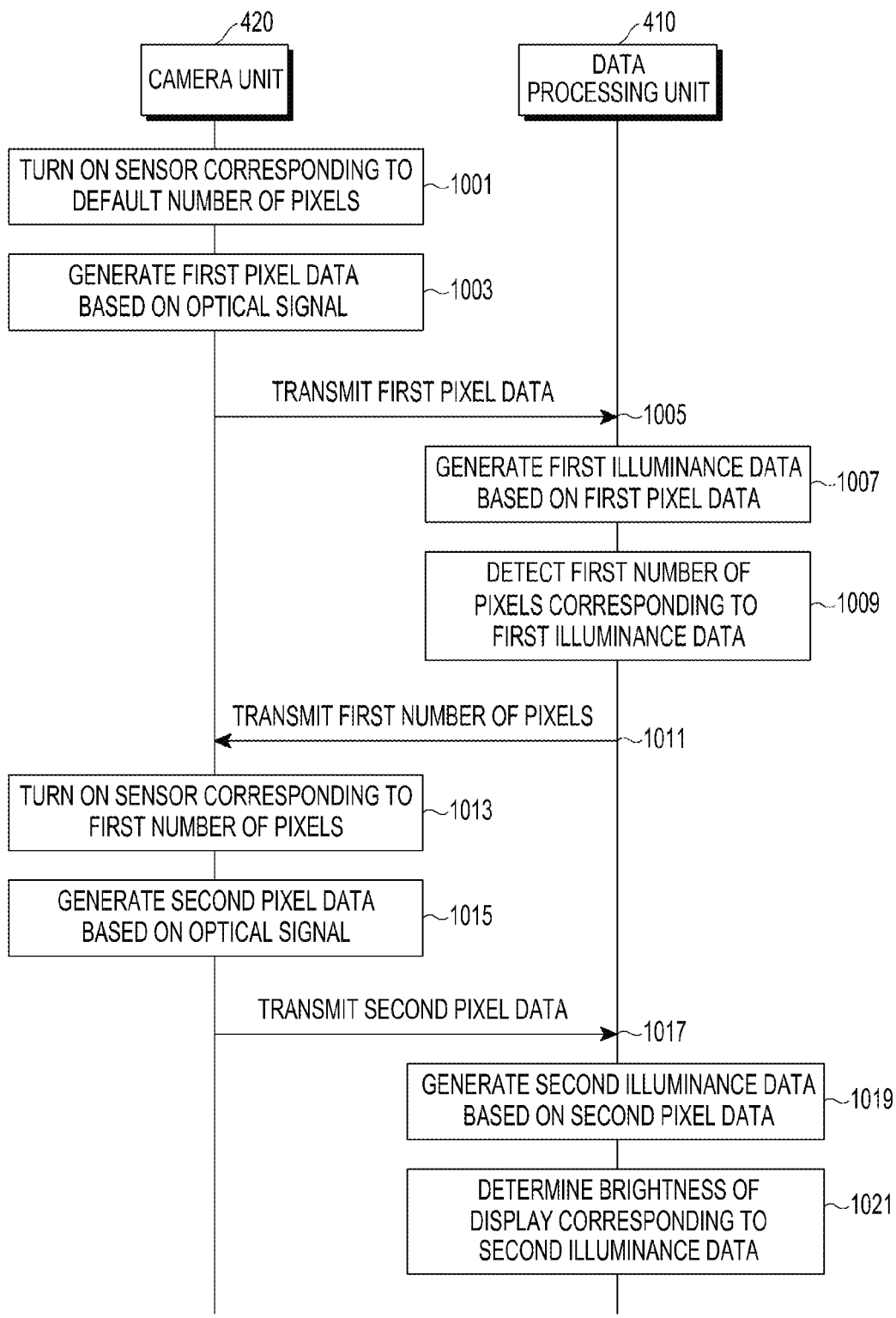
FIG. 10 illustrates a flowchart of an operation of preventing current consumption by an electronic device according to various exemplary embodiments of the present disclosure.

FIG. 10 illustrates a flowchart of an operation of preventing current consumption by an electronic device according to various exemplary embodiments of the present disclosure.

Referring to FIG. 10, in operation 1001, when a camera unit (the camera unit 420 of FIG. 4) disposed on the front of the electronic device has the function of an illumination sensor, the camera unit may turn on a sensor corresponding to the default number of pixels among a plurality of sensors corresponding to respective ones of a plurality of pixels.

In operation 1003, the camera unit 420 may generate first pixel data based on an optical signal received from the sensor corresponding to the default number of pixels.

In operation 1005, the camera unit 420 may transmit the generated first pixel data to a data processing unit (the data processing unit 410 of FIG. 4).

In operation 1007, the data processing unit 410 may generate first illuminance data based on the first pixel data received from the camera unit 420.

In operation 1009, the data processing unit 410 may detect the optimum first number of pixels corresponding to the first illuminance data by referring to data including the number of pixels corresponding to illuminance data stored in a memory (the memory 430 of FIG. 4).

In operation 1011, the data processing unit 410 may transmit the detected first number of pixels to the camera unit 420.

In operation 1013, the camera unit 420 may turn on a sensor corresponding to the first number of pixels among the plurality of pixels.

In operation 1015, the camera unit 420 may receive an optical signal from the sensor corresponding to the first number of pixels and may generate second pixel data based on the optical signal.

In operation 1017, the camera unit 420 may transmit the generated second pixel data to the data processing unit 410.

In operation 1019, the data processing unit 410 may generate second illuminance data based on the received second pixel data.

In operation 1021, the data processing unit 410 may determine the brightness of the display corresponding to the second illuminance data by referring to the data including the number of pixels corresponding to illuminance data stored in the memory (the memory 430 of FIG. 4).

Figure 11:
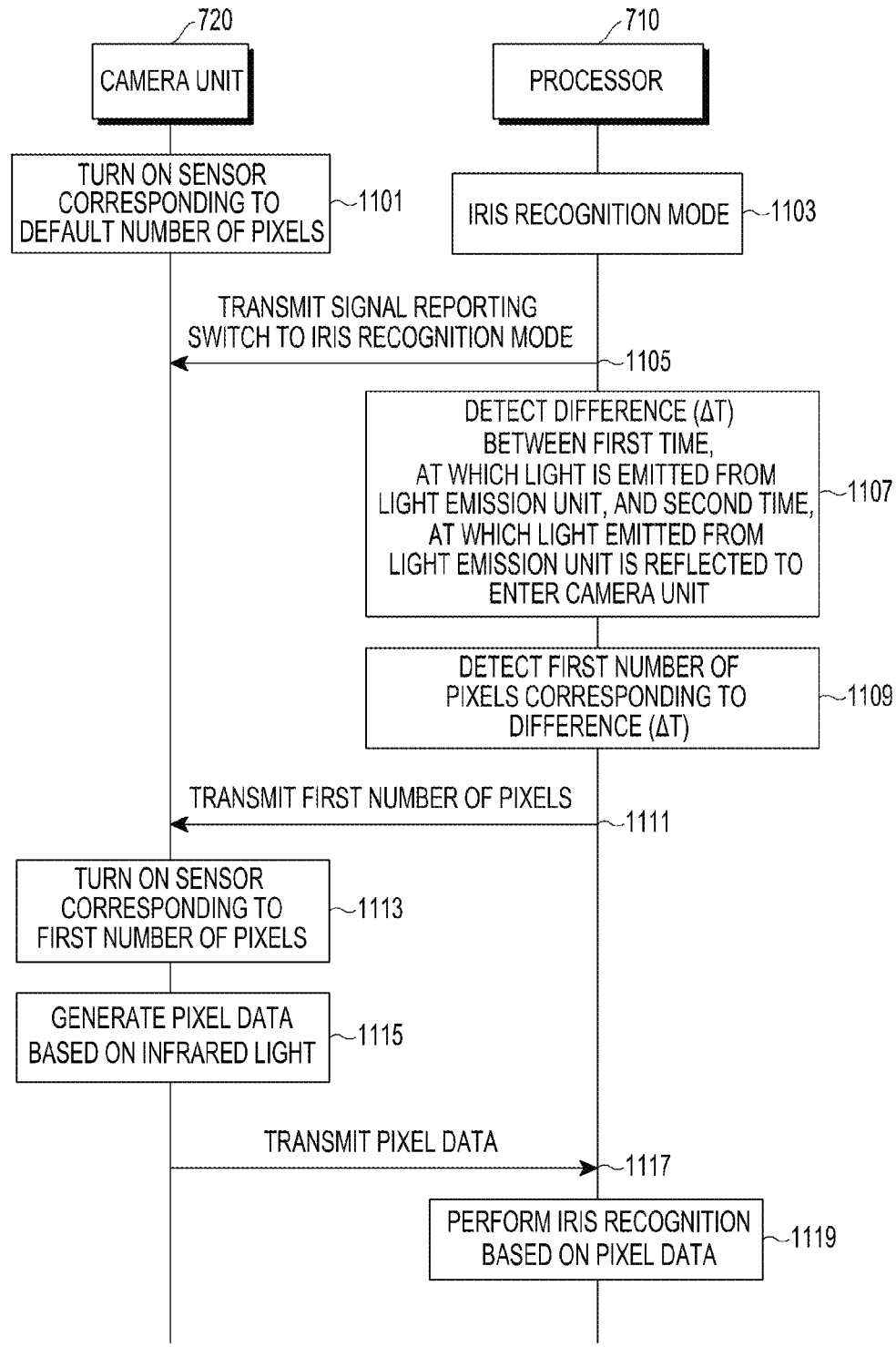
FIG. 11 illustrates a flowchart of an operation of preventing current consumption by an electronic device according to various exemplary embodiments of the present disclosure.

FIG. 11 illustrates a flowchart of an operation of preventing current consumption by an electronic device according to various exemplary embodiments of the present disclosure.

Referring to FIG. 11, in operation 1101, a camera unit (the camera unit 720 of FIG. 7) may turn on a sensor corresponding to the default number of pixels among a plurality of sensors corresponding to respective ones of a plurality of pixels.

When the electronic device (the electronic device 701 of FIG. 7) switches to the iris recognition mode in operation 1103, a processor (the processor 710 of FIG. 7) may transmit, to the camera unit 720, a signal reporting the switch to the iris recognition mode in operation 1005.

In operation 1107, in the iris recognition mode, the processor 710 may turn on a light emission unit (the light emission unit 730 of FIG. 7) and may identify a first time, at which light is emitted from the light emission unit, and a second time, at which the light emitted from the light emission unit and reflected by the iris=enters the camera unit 720. The processor 710 may detect the difference Δt between the first time and the second time.

In operation 1109, the processor 710 may detect the optimum first number of pixels corresponding to the difference Δt between the first time and the second time by referring to a table including the number of pixels corresponding to the distance in the iris recognition mode stored in a memory (the memory 740 of FIG. 7).

In operation 1111, the processor 710 may transmit the detected first number of pixels to the camera unit 720.

In operation 1113, the camera unit 720 may turn on a sensor corresponding to the first number of pixels among the plurality of pixels.

In operation 1115, the camera unit 720 may receive an optical signal from the sensor corresponding to the first number of pixels and may detect infrared light of the received optical signal. The camera unit 720 may generate pixel data based on the infrared light.

In operation 1117, the camera unit 720 may transmit the pixel data based on the infrared light to the processor 710.

In operation 1119, the processor 710 may perform an iris recognition operation based on the pixel data.

Figure 12:
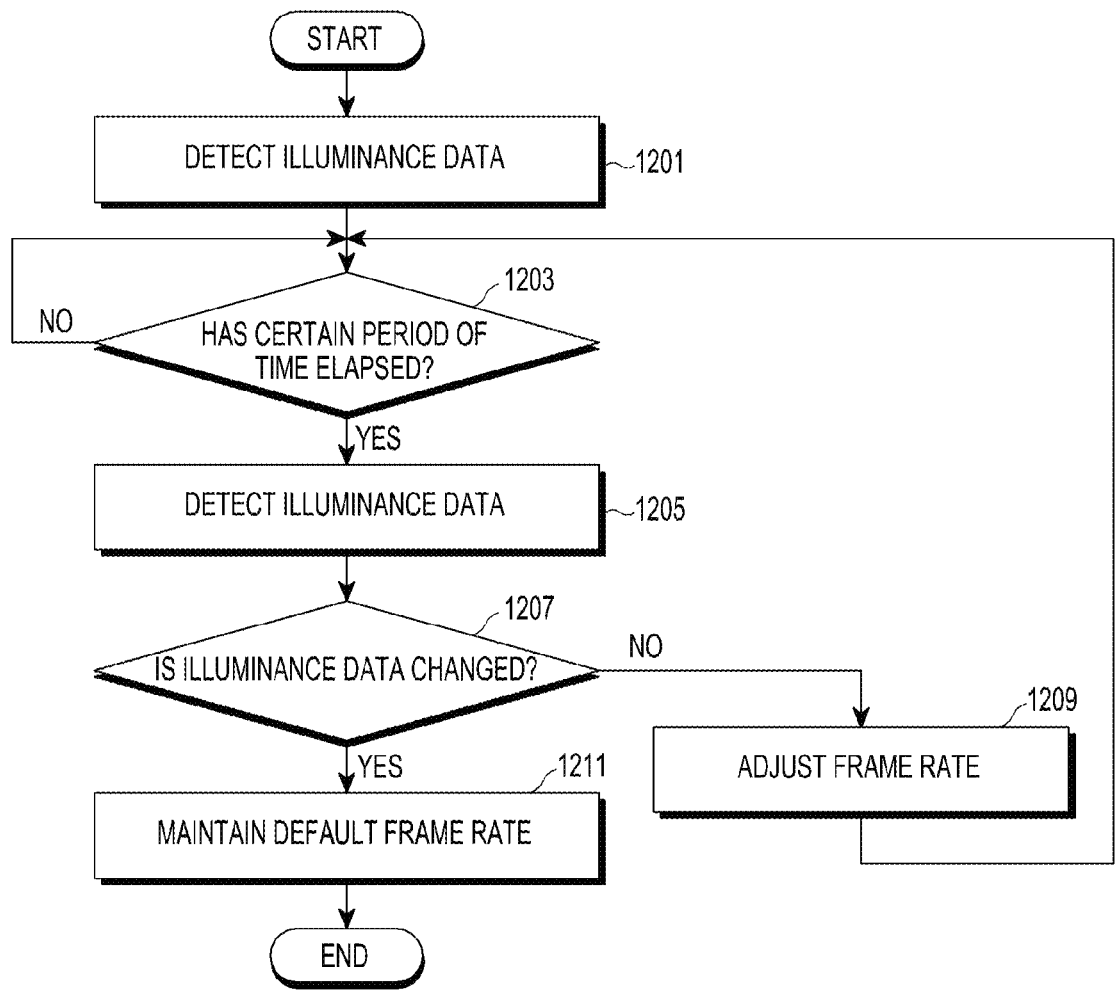
FIG. 12 illustrates a flowchart of an operation of preventing current consumption by an electronic device according to various exemplary embodiments of the present disclosure.

FIG. 12 illustrates a flowchart of an operation of preventing current consumption by an electronic device according to various exemplary embodiments of the present disclosure.

Referring to FIG. 12, in operation 1201, a processor (the processor 910 of FIG. 9) may detect illuminance data.

In operation 1203, the processor may determine whether a certain period of time has elapsed. When it is determined that the certain period of time has elapsed in operation 1203, the processor may detect illuminance data again in operation 1205.

In operation 1207, the processor may identify whether the illuminance data detected in operation 1201 is the same as the illuminance data detected in operation 1205.

When it is identified that the illuminance data detected in operation 1201 and the illuminance data detected in operation 1205 are the same in operation 1207, the processor may adjust the frame rate. In operation 1209, the processor may reduce the default number of frames by a predetermined number of frames.

The processor may sequentially reduce the number of frames at the frame rate by the predetermined number of frames by repeating operations 1203 to 1209, thereby preventing current consumption.

When it is identified that the illuminance data detected in operation 1201 and the illuminance data detected in operation 1205 are different from each other in operation 1207, the processor may maintain the default number of frames for the frame rate, or may adjust the number of frames for the frame rate, if changed, to the default number of frames.

Figure 13:
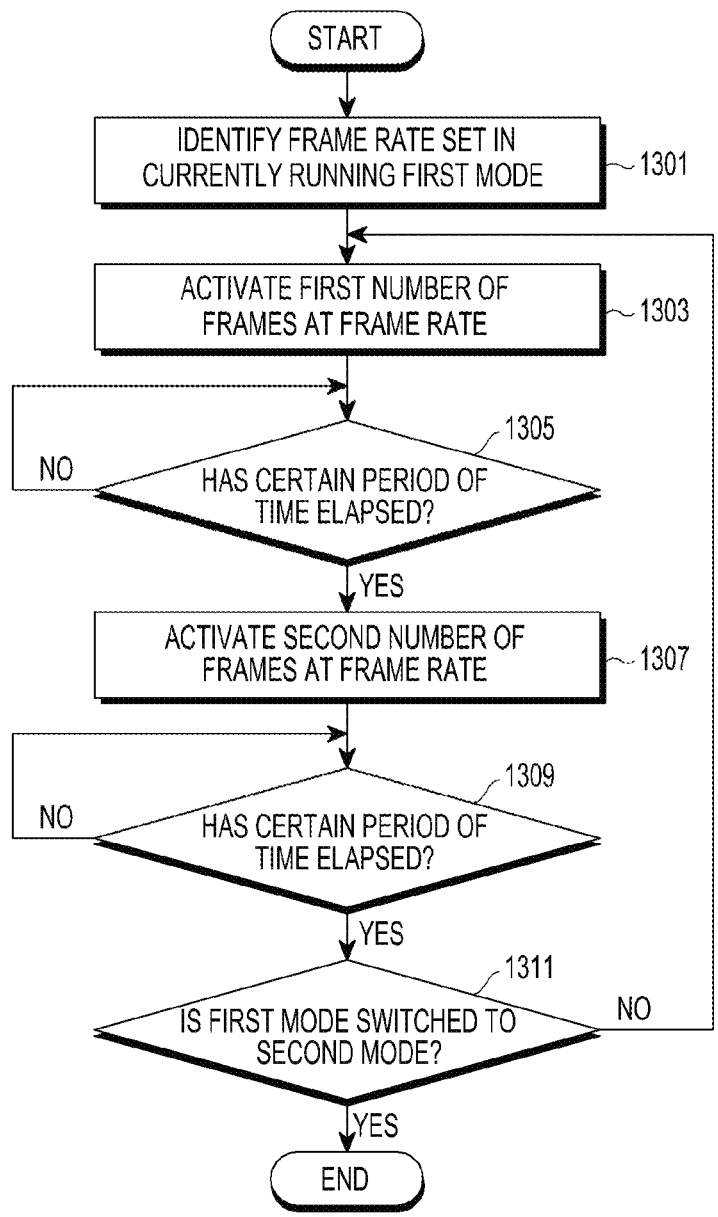
FIG. 13 illustrates a flowchart of an operation of preventing current consumption by an electronic device according to various exemplary embodiments of the present disclosure.

FIG. 13 illustrates a flowchart of an operation of preventing current consumption by an electronic device according to various exemplary embodiments of the present disclosure.

Referring to FIG. 13, in operation 1301, a processor (the processor 910 of FIG. 9) may identify a frame rate set in a first mode in which the electronic device is currently operating. The processor may classify frames (first to tenth frames) for the frame rate into the first number of frames (first, third, fifth, seventh, and ninth frames) and the second number of frames (second, fourth, sixth, eighth, and tenth frames).

In operation 1303, the processor may activate the first number of frames and may deactivate the second number of frames at the frame rate.

In operation 1305, the processor may determine whether a certain period of time has elapsed. When it is determined that the certain period of time has elapsed, the processor may activate the second number of frames and may deactivate the first number of frames at the frame rate in operation 1307.

In operation 1309, the processor may determine whether a certain period of time has elapsed. When it is determined that the certain period of time has elapsed and it is determined that the current first mode is maintained in operation 1311, the processor may perform operation 1303.

The processor may alternately activate the first number of frames and the second number of frames at the frame rate by repeating operations 1303 to 1311, thereby preventing current consumption.

When the first mode is switched to a second mode in operation 1311 and it is determined that termination of the first mode is maintained, the processor may terminate the current operation.

According to various exemplary embodiments, a method for preventing current consumption by an electronic device may include: transmitting a first number of pixels to a camera unit by detecting the first number of pixels corresponding to first illuminance data based on first pixel data received from the camera unit; and determining a brightness of a display corresponding to second illuminance data based on second pixel data received from the camera unit in which a sensor corresponding to the first number of pixels is turned on.

According to various exemplary embodiments, the transmitting may include: generating the first illuminance data based on the first pixel data received from the camera unit in which a sensor corresponding to a default number of pixels is turned on; and detecting the first number of pixels corresponding to the first illuminance data.

According to various exemplary embodiments, the determining of the brightness may include: generating the second illuminance data based on the second pixel data received from the camera unit; and determining the brightness of the display based on the second illuminance data.

According to various exemplary embodiments, the method may further include: generating, by a first processing unit of a data processing unit of the electronic device, image data based on pixel data received from the camera unit and determining the brightness of the display based on the first pixel data and the second pixel data that are received from the camera unit in a photographing mode of the electronic device; and determining, by a second processing unit of the data processing unit, the brightness of the display based on the first pixel data and the second pixel data that are received from the camera unit when the photographing mode of the electronic device is terminated.

According to various exemplary embodiments, the method may further include: determining, by a first processing unit of a data processing unit of the electronic device, the brightness of the display based on the first pixel data and the second pixel data that are received from the camera unit in an awake mode of the electronic device; and determining, by a second processing unit of the data processing unit, the brightness of the display based on the first pixel data and the second pixel data that are received from the camera unit in a sleep mode of the electronic device.

According to various exemplary embodiments, the method may further include: detecting a distance between the electronic device and an iris in an iris recognition mode; detecting the first number of pixels corresponding to the detected distance; and transmitting the first number of pixels to the camera unit so that the sensor corresponding to the first number of pixels is turned on in the camera unit.

According to various exemplary embodiments, the detecting of the first number of pixels may include detecting the first number of pixels corresponding to a difference between a first time, at which light is emitted from a light emission unit of the electronic device, and a second time, at which the light emitted from the light emission unit and reflected by the iris enters the camera unit.

According to various exemplary embodiments, the method may further include: adjusting a frame rate when illuminance data is unchanged for a certain period of time.

According to various exemplary embodiments, the adjusting may include reducing a number of frames at the frame rate by a predetermined number of frames at regular time intervals for the certain period of time in which the illuminance data is unchanged.

According to various exemplary embodiments, the method may further include: classifying frame rates into a first number of frames and a second number of frames; and alternately activating the first number of frames and the second number of frames.

According to various exemplary embodiments, a storage medium stores a program, wherein the program may perform, in an electronic device: transmitting a first number of pixels to a camera unit by detecting the first number of pixels corresponding to first illuminance data based on first pixel data received from the camera unit; and determining a brightness of a display corresponding to second illuminance data based on second pixel data received from the camera unit in which a sensor corresponding to the first number of pixels is turned on.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
    a camera; and
    a processor configured to:
        detect a first number of pixels corresponding to first illuminance data based on first pixel data received from the camera,
        transmit the first number of pixels to the camera to activate one or more sensors corresponding to the first number of pixels, and
        determine a brightness of a display corresponding to second illuminance data based on second pixel data received from the camera in which the one or more sensors corresponding to the first number of pixels are activated.

2. The electronic device of claim 1, wherein the processor is further configured to:
    generate the first illuminance data based on the first pixel data received from the camera in which a sensor corresponding to a default number of pixels is turned on; and
    detect the first number of pixels corresponding to the first illuminance data.

3. The electronic device of claim 1, wherein the processor is further configured to:
generate the second illuminance data based on the second pixel data received from the camera; and
determine the brightness of the display based on the second illuminance data.

4. The electronic device of claim 1, wherein the processor is configured to:
generate image data based on pixel data received from the camera; and
detect the first number of pixels based on the first pixel data received from the camera and determine the brightness of the display based on the second pixel data.

5. The electronic device of claim 1, wherein the processor is configured to:
generate image data based on pixel data received from the camera and determine the brightness of the display based on the first pixel data and the second pixel data that are received from the camera in a photographing mode of the electronic device; and
determine the brightness of the display based on the first pixel data and the second pixel data that are received from the camera when the photographing mode of the electronic device is terminated.

6. The electronic device of claim 1, wherein the processor is configured to:
determine the brightness of the display based on the first pixel data and the second pixel data that are received from the camera in an awake mode of the electronic device; and
determine the brightness of the display based on the first pixel data and the second pixel data that are received from the camera in a sleep mode of the electronic device.

7. The electronic device of claim 1, wherein the camera is configured to:
turn on a sensor corresponding to a default number of pixels;
generate the first pixel data based on an optical signal received through the sensor;
transmit the first pixel data to the processor;
turn on the sensor corresponding to the first number of pixels received from the processor;
generate the second pixel data based on an optical signal received through the sensor corresponding to the first number of pixels; and
transmit the second pixel data to the processor.

8. The electronic device of claim 1, further comprising a light emission unit configured to emit light in an iris recognition mode,
wherein the processor is configured to detect the first number of pixels corresponding to a distance between the electronic device and an iris in the iris recognition mode and transmit the first number of pixels to the camera so that the one or more sensors corresponding to the first number of pixels is turned on in the camera.

9. The electronic device of claim 8, wherein the processor is configured to detect the first number of pixels corresponding to a difference between a first time, at which light is emitted from the light emission unit, and a second time, at which the light emitted from the light emission unit reflected by the iris enters the camera.

10. The electronic device of claim 1, wherein the processor is configured to adjust a frame rate when illuminance data is unchanged for a certain period of time.

11. The electronic device of claim 10, wherein the processor is further configured to reduce a number of frames at the frame rate by a predetermined number of frames at regular time intervals for the certain period of time in which the illuminance data is unchanged.

12. The electronic device of claim 1, wherein the processor is configured to classify a frame rate into a first number of frames and a second number of frames and alternately activate the first number of frames and the second number of frames at regular time intervals.

13. A method for preventing current consumption by an electronic device, the method comprising:
transmitting a first number of pixels to a camera by detecting the first number of pixels corresponding to first illuminance data based on first pixel data received from the camera;
activating, by the camera, one or more sensors corresponding to the first number of pixels; and
determining a brightness of a display corresponding to second illuminance data based on second pixel data received from the camera in which a sensor corresponding to the first number of pixels is turned on.

14. The method of claim 13, wherein the transmitting includes:
generating the first illuminance data based on the first pixel data received from the camera in which a sensor corresponding to a default number of pixels is turned on; and
detecting the first number of pixels corresponding to the first illuminance data.

15. The method of claim 13, wherein the determining of the brightness includes:
generating the second illuminance data based on the second pixel data received from the camera; and
determining the brightness of the display based on the second illuminance data.

16. The method of claim 13, further comprising:
generating, by a processor of the electronic device, image data based on pixel data received from the camera and determining the brightness of the display based on the first pixel data and the second pixel data that are received from the camera in a photographing mode of the electronic device; and
determining, by the processor, the brightness of the display based on the first pixel data and the second pixel data that are received from the camera when the photographing mode of the electronic device is terminated.

17. The method of claim 13, further comprising:
determining, by a processor of the electronic device, the brightness of the display based on the first pixel data and the second pixel data that are received from the camera in an awake mode of the electronic device; and
determining, by the processor, the brightness of the display based on the first pixel data and the second pixel data that are received from the camera in a sleep mode of the electronic device.

18. The method of claim 13, further comprising:
detecting a distance between the electronic device and an iris in an iris recognition mode;
detecting the first number of pixels corresponding to the detected distance; and
transmitting the first number of pixels to the camera so that the one or more sensors corresponding to the first number of pixels is turned on in the camera.

19. The method of claim 18, wherein the detecting of the first number of pixels comprises detecting the first number of pixels corresponding to a difference between a first time, at which light is emitted from a light emission of the electronic device, and a second time, at which the light emitted from the light emission reflected by the iris enters the camera.

20. The method of claim 13, further comprising:

adjusting a frame rate when illuminance data is unchanged for a certain period of time, wherein the adjusting comprises reducing a number of frames at the frame rate by a predetermined number of frames at regular time intervals for the certain period of time in which the illuminance data is unchanged.

* * * * *